Feb. 5, 1952     E. B. DAYTON ET AL     2,584,430
FISHHOOK HOLDER
Filed June 4, 1949
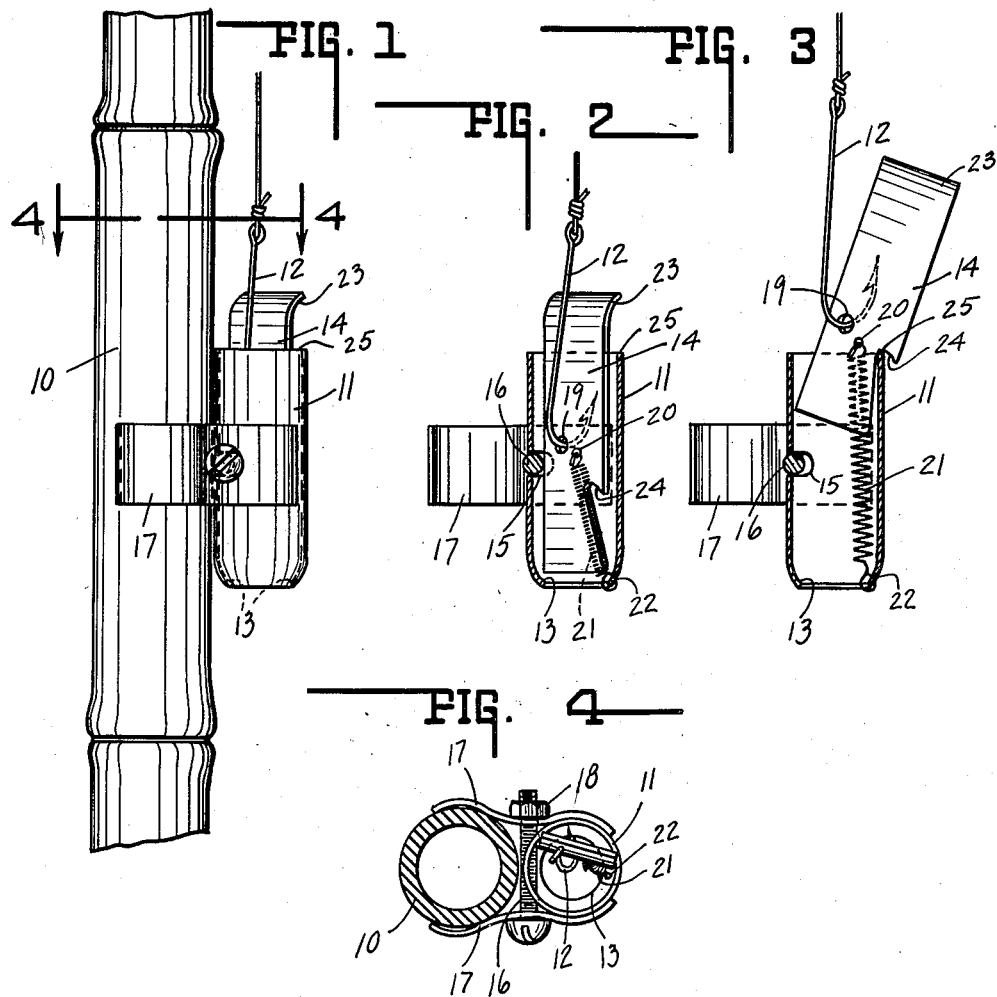
INVENTORS.
ERVIS B. DAYTON.
AUDRIA P. SWEM.
BY
Lockwood, Goldsmith Galt.
ATTORNEYS.

Patented Feb. 5, 1952

2,584,430

UNITED STATES PATENT OFFICE 2,584,430

FISHHOOK HOLDER

Ervis B. Dayton and Audria P. Swem, Indianapolis, Ind.

Application June 4, 1949, Serial No. 97,182

2 Claims. (Cl. 43—25)

This invention relates to a fish hook holder.

The primary object of this invention is to provide a holder or container adapted to readily receive and accommodate a fish hook when the pole and the line are not in use. It is recognized that there are dangers to the clothing or person of a fisherman inherent in carrying a fishing pole without safely anchoring the hook in some manner. There is also danger that the hook itself will be damaged. These disadvantages are overcome through use of this invention.

It is a further object of the invention to provide a holder which may be attached snugly to a fishing pole, thereby presenting as small a protuberance as possible.

It is a still further object of the invention to provide a holder which will safely accommodate many different sizes of hooks, and which may be readily attached to poles of any reasonable diameters.

It is a still further object of the invention to provide a holder which will be simple and yet durable in construction; which will be inexpensive in price and yet neat and attractive in appearance.

The primary feature of the invention resides in the provision of a tension member which is anchored within the holder and to which the hook is secured.

The full nature of the invention will be understood from the accompanying drawings and the following description and claims.

In the drawings

Fig. 1 is a side elevation view of the invention showing a portion of the fishing pole to which it is secured.

Fig. 2 is a vertical section view showing the tension member in retracted position with the hook secured thereto.

Fig. 3 is a vertical section view showing the tension member in extended position with the hook secured thereto.

Fig. 4 is a horizontal section view taken on the line 4—4 of Fig. 1 in the direction of the arrows.

In the drawings 10 shows a cane pole to which the holder is adapted to be secured. This pole may, of course, be a casting rod, it being of no consequence insofar as the invention is concerned, since it is adapted to be secured to any type of pole.

A tubular container or casing 11 is formed to a size sufficient to receive and accommodate any reasonably sized fishing hook such as that shown at 12. The container is open at the top and may either be open or closed at the bottom. In the drawings it is shown open. It is preferable to turn the wall of the container inwardly adjacent the bottom thereof in order to form the stop shoulders 13. But this is purely a matter of choice since a shoulder to stop the downward movement of the tension member 14 may be provided interiorly of the container in any other satisfactory manner.

Intermediate the ends of the container, the wall thereof is notched as at 15 to permit the bolt 16 to extend therethrough. This bolt extends through apertures formed in the generally E-shaped opposed clamp members 17, which embrace the pole and the container, respectively. The nut 18 may be tightened until the container is firmly clamped to the pole. Since the bolt extends through the notch, it is possible to bring the container closer to the pole and thereby reduce the extent to which it will jut out therefrom.

The tension member may be formed in any desired shape but must have a width which is sufficiently less than the diameter of the container to enable it to be moved freely up and down therewithin. Intermediate the ends of the tension member there is formed an aperture 19 which is large enough to permit the free end of a fishing hook to be inserted therethrough for anchorage purposes. A second aperture 20 is preferably formed in the tension member to enable one end of a coil spring 21 or the like to be secured thereto. The opposite end of the spring is secured to the bottom of the container in any suitable manner, although in the drawings, it is shown looped through the aperture 22.

The coil spring normally constrains the tension member to its retracted position (see Fig. 2). When it is desired to house the hook within the holder, the upper portion of the tension member which normally projects beyond the holder is grasped and pulled outwardly against the constraint of the spring. In order to make it easier to be grasped, this projecting portion may be curved as at 23. Once it is pulled outwardly a sufficient distance to expose the hook anchorage aperture, the tension member may be latched in such position. This is accomplished by the provision of a notch 24 in the side edge of the member, which is adapted to engage and seat upon the end 25 of the holder. After the member is latched in that position, the fisherman can extend the hook through the aperture. He then can unlatch the member by pulling it upwardly a slight distance, whereupon the constraint of the spring will cause the member to assume its normally retracted position within the holder, carrying the hook with it. The downward sliding movement of the member is stopped by the stop members 13.

While the invention has been illustrated and described in its preferred embodiment in the drawings and foregoing description, the same is to be considered as illustrative and not restrictive in character.

The invention claimed is:

1. A safety device for concealing the hook portion of a line secured fish hook, comprising a tubular casing having at least one open end, means for detachably securing said casing to the body of a fishing pole, a tension member slidably mounted within said casing and having such a length relative thereto that when in retracted position the upper end portion of said member normally projects beyond said casing for finger grip purposes, said member having hook anchoring means formed therein substantially below said normally projecting portion, spring means interconnecting said member and said casing for normally biasing said member to a retracted position therewithin, said member and said casing having complementary interlocking means for holding said member in extended position in opposition to the tension of said spring means to facilitate hook connection to or removal from said member, and stop shoulders on said casing to stop the downward movement of said member.

2. A safety device for concealing the hook portion of a line secured fish hook, comprising a tubular casing having at least one open end, means for detachably securing said casing to the body of a fish pole, a tension plate having a notch formed in one of its side edges, said plate being slidable within said casing and having a portion thereof normally projecting therebeyond when in retracted position for finger grip purposes, hook anchoring means formed in said plate substantially below the projecting portion thereof and adjacent said notch, spring means interconnecting said plate and said casing for normally biasing said plate to a retracted position within, said notch being engageable with the open end edges of said casing for retaining said plate in extended position to facilitate hook connection to or removal from said anchoring means, and stop shoulders on said casing to stop the downward movement of said member.

ERVIS B. DAYTON.
AUDRIA P. SWEM.

REFERENCES CITED

The following references are of record in the file of this patent:

UNITED STATES PATENTS

| Number | Name | Date |
| --- | --- | --- |
| 154,141 | Hill | Aug. 18, 1874 |
| 1,216,069 | Cammack | Feb. 13, 1917 |
| 1,451,256 | Gardner | Apr. 10, 1923 |
| 2,285,888 | Benton | June 9, 1942 |

FOREIGN PATENTS

| Number | Country | Date |
| --- | --- | --- |
| 606,406 | France | June 14, 1926 |